(12) United States Patent
Murakami et al.

(10) Patent No.: US 8,004,735 B2
(45) Date of Patent: Aug. 23, 2011

(54) IMAGE FORMING APPARATUS

(75) Inventors: Tomoyuki Murakami, Miyagi (JP);
Takashi Tanaka, Miyagi (JP); Makoto Endo, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 152 days.

(21) Appl. No.: 12/453,976

(22) Filed: May 28, 2009

(65) Prior Publication Data

US 2009/0296179 A1  Dec. 3, 2009

(30) Foreign Application Priority Data

Jun. 3, 2008 (JP) ................... 2008-145824

(51) Int. Cl.
*G02B 26/08* (2006.01)
(52) U.S. Cl. ...................................... 359/216.1
(58) Field of Classification Search ............... 359/200.1, 359/216.1
See application file for complete search history.

(56) References Cited

U.S. PATENT DOCUMENTS

| 7,379,086 | B2 * | 5/2008 | Nakamura ............ 347/257 |
| 7,420,723 | B2 | 9/2008 | Itami et al. |
| 2001/0001251 | A1 | 5/2001 | Tachibe et al. |
| 2004/0246453 | A1 | 12/2004 | Nakamura |

FOREIGN PATENT DOCUMENTS

| JP | 08-002000 | 1/1996 |
| JP | 2774444 | 4/1998 |
| JP | 2001-337291 | 7/2001 |
| JP | 2001-296495 | 10/2001 |
| JP | 2002-107649 | 4/2002 |
| JP | 2006-035570 | 2/2006 |

OTHER PUBLICATIONS

Abstract of JP 07-306373 published on Nov. 21, 1995.
European Search Report dated Aug. 13, 2009 for corresponding European Application No. 09251467.8-2117.

* cited by examiner

*Primary Examiner* — Euncha P Cherry
(74) *Attorney, Agent, or Firm* — Harness, Dickey & Pierce, P.L.C.

(57) ABSTRACT

A polygon scanner including a polygon mirror, a bearing, a polygon motor, and a scanner board is mounted in an optical housing. A scanner-unit attachment portion to which the polygon scanner is attached is formed as a convex portion protruded from a bottom plate of the optical housing such that at least a planar shape of the polygon mirror is surrounded by the convex portion. The scanner board makes a tight contact with an upper surface of the convex portion in direct contact with each other, so that a bottom of the polygon scanner is covered by the convex portion and the bottom plate of the optical housing in a sealed manner.

16 Claims, 11 Drawing Sheets

IMAGE FORMING APPARATUS

CROSS-REFERENCE TO RELATED APPLICATIONS

The present application claims priority to and incorporates by reference the entire contents of Japanese priority document 2008-145824 filed in Japan on Jun. 3, 2008.

BACKGROUND OF THE INVENTION

1. Field of the Invention

The present invention relates to an optical scanning device and an image forming apparatus including the optical scanning device.

2. Description of the Related Art

An image forming apparatus, such as a laser beam printer, a digital copying machine, or a laser facsimile, includes an optical scanning device for forming a latent image on a surface of an image carrier (photosensitive element). Some optical scanning devices are configured such that a light flux (light beam) emitted from a light source is deflected by a rotating deflector whereby a surface of a photosensitive element is irradiated with the light flux.

In recent years, an image forming apparatus is required to achieve a higher print speed and a higher pixel density, and to satisfy such a requirement, the image forming apparatus needs to include a polygon scanner capable of rotating at a high speed from 40,000 revolutions per minute (rpm) to 50,000 rpm. Major technical problems in manufacturing the polygon scanner capable of rotating at the high speed are vibration noise generated by a motor and an increasing amount of generated heat in accordance with increase in power consumption due to the high speed rotation of the polygon scanner.

To solve the problem about noise, the image forming apparatus needs to be designed to achieve a quiet operation as well as the higher print speed and the higher pixel density. Because attention is particularly focused on noise generated by the polygon scanner as a problem about noise in performance of the image forming apparatus, it is important that a system needs to be designed to achieve a quiet operation.

The vibration noise generated by the motor is classified into four types of noises, i.e., wind roar caused by a polygon mirror, vibration noise caused due to bending of a rotary shaft, noise caused due to excitation of a wound coil of the motor, and vibration noise caused due to friction of a bearing. Theses noises are transmitted to outside as vibration noises, resulting in leakage of noise.

Furthermore, a higher current value is required to achieve the high speed rotation of the polygon scanner, and therefore temperature inside an optical scanning device (writing unit) is increased due to an increasing amount of generated heat in accordance with increase in power consumption. If a laser beam emitted from a laser included in the optical scanning device is interrupted by dust along a scanning line of the laser beam, an image is printed out with a white line formed thereon. To prevent dust inside the optical scanning device, the optical scanning device needs to be completely sealed.

Because a large number of components of a scanning optical system, such as a lens that is easily affected by heat, are mounted in the optical scanning device, if the polygon scanner that is a heat source is mounted in a sealed housing, the optical scanning device needs to have a configuration for efficiently exhausting heat. According to a specification of a polygon scanner capable of rotating at more than 40,000 rpm as recently required, it is difficult for the polygon scanner itself to achieve the reduction of noise and the efficient heat exhaust.

Japanese Patent Application Laid-open No. 2006-35570 discloses an image forming apparatus in which a polygon-scanner attachment member is arranged as a separate member to attach a polygon scanner to an optical housing on which a component of a scanning optical system is mounted, and the optical housing and the polygon-scanner attachment member are fixed to a main-body frame of the image forming apparatus.

Japanese Patent Application Laid-open No. H8-2000 discloses an image forming apparatus in which a component of a scanning optical system is attached to an optical housing and a polygon scanner is fixed to a main-body frame of the image forming apparatus, so that vibration of the polygon scanner is not directly transmitted to the scanning optical system.

Japanese Patent Application Laid-open No. 2001-296495 discloses a configuration for sealing a polygon scanner by a heat releasing member whereby heat release and noise reduction are achieved.

Japanese Patent No. 2774444 discloses a stand-alone configuration of a polygon scanner in which an area where a polygon mirror is mounted is completely sealed so that leakage of noise is prevented.

Japanese Patent Application Laid-open No. 2002-107649 discloses a stand-alone configuration of a polygon scanner in which an elastic sealing member is arranged to reduce leakage of wind roar caused by a polygon mirror.

However, in the image forming apparatus disclosed in Japanese Patent Application Laid-open No. 2006-35570, because the polygon-scanner attachment member is directly fixed to the main-body frame, tilt characteristics of a surface of a polygon mirror depends on assembly accuracy of the main-body frame, which can cause pitch irregularity in a sub-scanning direction. Furthermore, if the polygon scanner is tilted, a laser light can be projected outside of an effective area of the polygon mirror. Thus, it is difficult to achieve mass production.

In the image forming apparatus disclosed in Japanese Patent Application Laid-open No. H8-2000, because the polygon scanner is directly fixed to the main-body frame, problems similar to those in the image forming apparatus disclosed in Japanese Patent Application Laid-open No. 2006-35570 can occur.

In the configuration disclosed in Japanese Patent Application Laid-open No. 2001-296495, it is necessary to obtain surface accuracy of a surface of the heat releasing member to be in contact with an optical housing and surface accuracy of an attachment surface of a polygon scanner board because of tilt characteristics of a surface of a polygon mirror. Therefore, it is difficult to use a heat releasing member manufactured by pressing. Furthermore, resonance with the heat releasing member can occur. Moreover, because the polygon scanner that is a heat source is completely sealed in a small space, it is difficult to release heat.

In the configuration disclosed in Japanese Patent publication No. 2774444, because a polygon-scanner board is fixed to a polygon housing and the polygon housing is attached to an optical housing, it is difficult to achieve efficient heat exhaust for the high speed rotation of the polygon scanner. This is because heat exhaust efficiency is improved if a component that is resistant to heat is not mounted in a heat exhaust pathway.

In the configuration disclosed in Japanese Patent Application Laid-open No. 2002-107649, it is difficult to perform efficient heat exhaust, and the noise reduction and the prevention of heat generation cannot be achieved in the polygon scanner capable of rotating at a high speed.

SUMMARY OF THE INVENTION

It is an object of the present invention to at least partially solve the problems in the conventional technology.

According to one aspect of the present invention, there is provided an optical scanning device including a polygon scanner that includes a polygon mirror that reflects a light beam emitted from a light source, a bearing that rotatably supports the polygon mirror, a polygon motor that rotates the polygon mirror, and a scanner board on which a component of the polygon motor is mounted; an optical housing in which the polygon scanner is mounted; and a scanner-unit attachment portion to which the polygon scanner is attached, the scanner-unit attachment portion being formed as a convex portion protruded from a bottom plate of the optical housing such that at least a planar shape of the polygon mirror is surrounded by the convex portion. The scanner board makes a tight contact with an upper surface of the convex portion in direct contact with each other, so that a bottom of the polygon scanner is covered by the convex portion and the bottom plate of the optical housing in a sealed manner.

Furthermore, according to another aspect of the present invention, there is provided an image forming apparatus including an optical scanning device that scans a scanning surface with a light beam. The optical scanning device includes a polygon scanner including a polygon mirror that reflects a light beam emitted from a light source, a bearing that rotatably supports the polygon mirror, a polygon motor that rotates the polygon mirror, and a scanner board on which a component of the polygon motor is mounted; an optical housing in which the polygon scanner is mounted; and a scanner-unit attachment portion to which the polygon scanner is attached, the scanner-unit attachment portion being formed as a convex portion protruded from a bottom plate of the optical housing such that at least a planar shape of the polygon mirror is surrounded by the convex portion. The scanner board makes a tight contact with an upper surface of the convex portion in direct contact with each other, so that a bottom of the polygon scanner is covered by the convex portion and the bottom plate of the optical housing in a sealed manner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
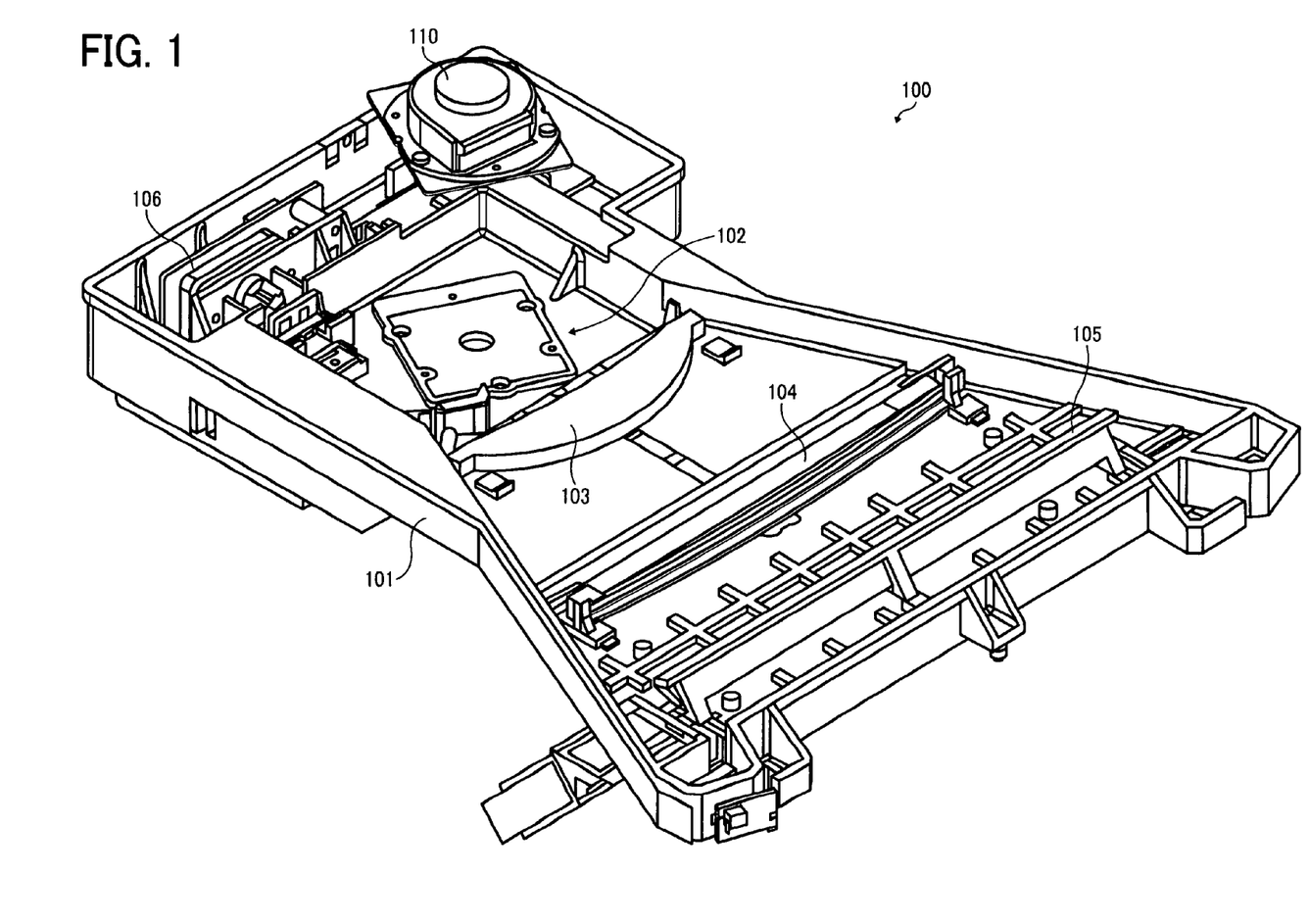
FIG. 1 is a perspective view of an optical scanning device for explaining the configuration of its relevant part according to a first embodiment of the present invention.

FIG. 1 is a perspective view of an optical scanning device 100 for explaining the configuration of its relevant part according to a first embodiment of the present invention. The optical scanning device 100 has the configuration as described below. A scanner-unit attachment portion 102 is formed on a bottom plate 101a of an optical housing 101 included in the optical scanning device 100, and a polygon scanner 110 is fixedly attached to the scanner-unit attachment portion 102. Optical elements such as an fθ lens 103, a long lens 104, and a reflecting mirror 105, a light-source unit 106 including a laser diode (not shown) as a light source, and the like, are mounted in the optical housing 101.

Figure 2:
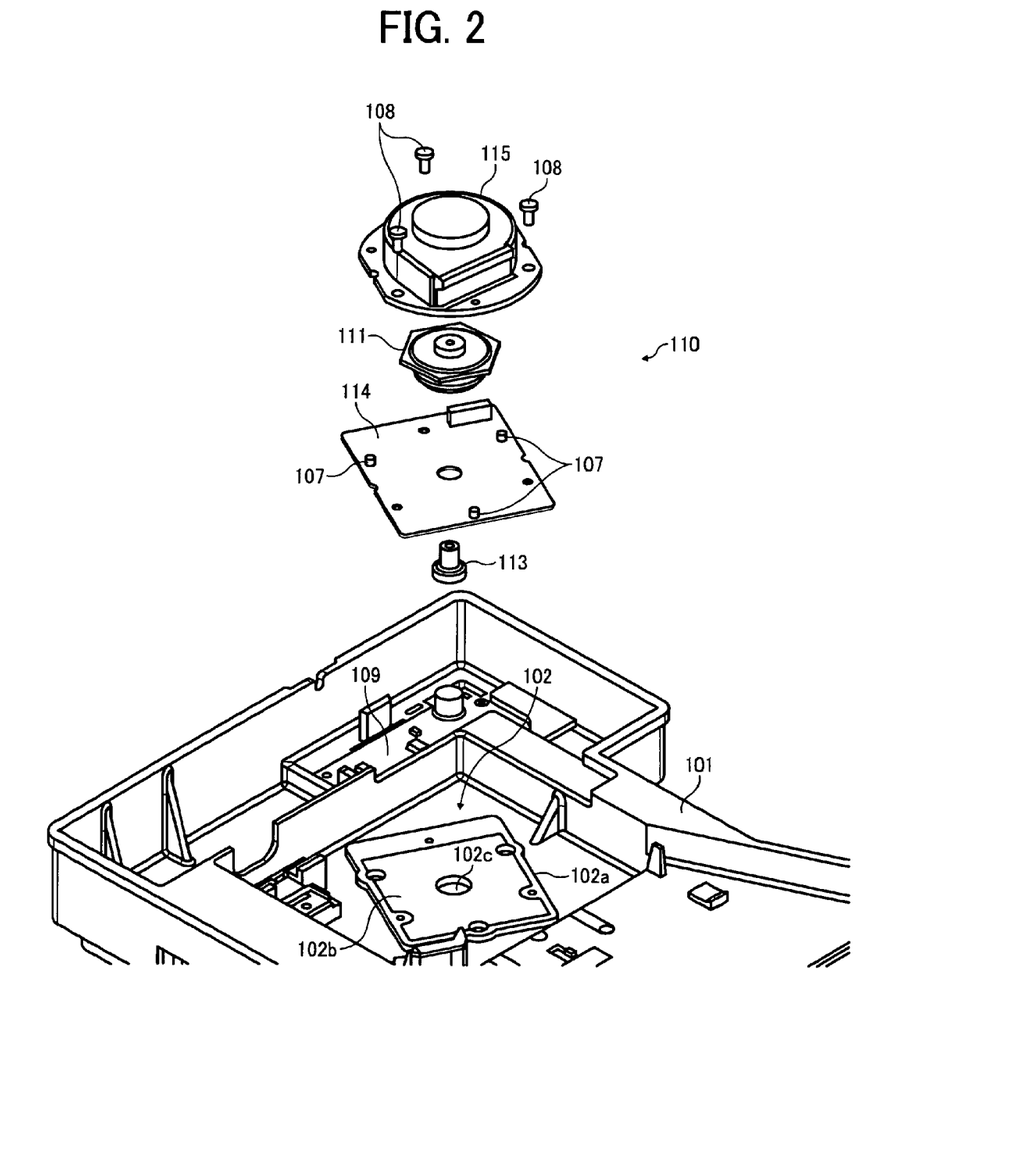
FIG. 2 is a schematic diagram of a part of an optical housing shown in FIG. 1 and a polygon scanner shown in FIG. 1 that is illustrated in an exploded manner.
Figure 3A:
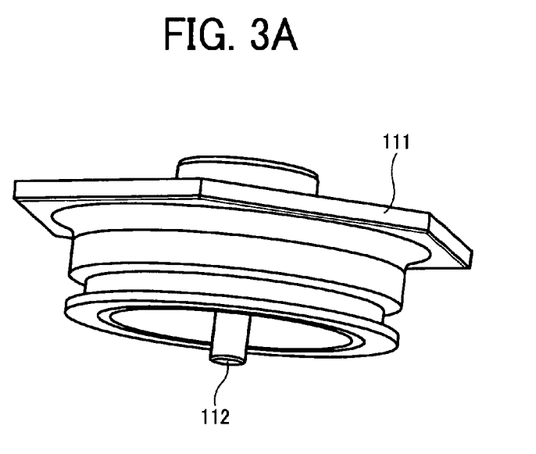
FIGS. 3A and 3B are perspective views of a relevant part of the polygon scanner.
Figure 3B:
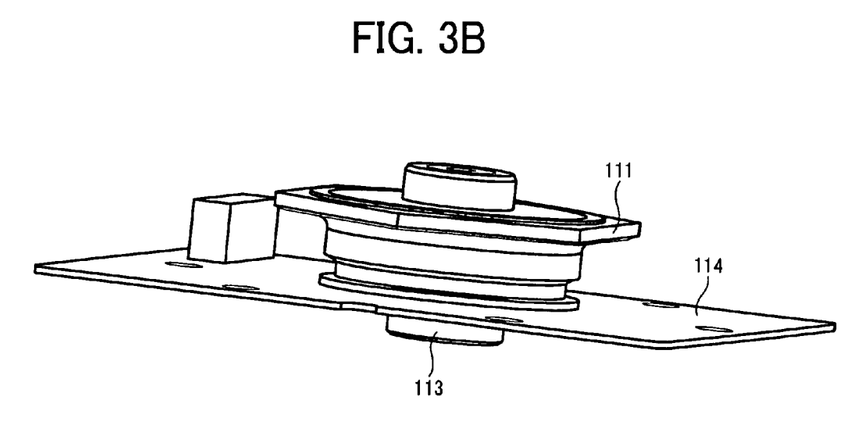

FIG. 2 is a schematic diagram of a part of the optical housing 101 and the polygon scanner 110 that is illustrated in an exploded manner. FIGS. 3A and 3B are perspective views of the relevant part of the polygon scanner 110. The polygon scanner 110 includes a polygon mirror 111, a rotary shaft 112 to which the polygon mirror 111 is attached to be rotated, a bearing 113 that supports the rotary shaft 112, a scanner board 114, and a cover 115. The cover 115 is fixed to the scanner board 114 with screws 107. The polygon scanner 110 is fixed to the optical housing 101 (the scanner-unit attachment portion 102) with screws 108.

The polygon mirror 111 reflects a light beam emitted from the laser diode included in the light-source unit 106. The polygon mirror 111 is attached to the rotary shaft 112 and is rotatably supported by the scanner board 114 via the bearing 113. The minimum number of components required for rotating the polygon mirror 111, such as a magnetizing coil 116, a magnet (not shown), a hall element (not shown), wiring (not shown), and a connector 117, are mounted on the scanner board 114, thereby forming a polygon motor. The scanner board 114 is an iron board or a glass epoxy board having an iron plate attached to its lower surface, and the scanner board 114 is superior in strength, magnetic shielding, and heat release efficiency.

Figure 4A:
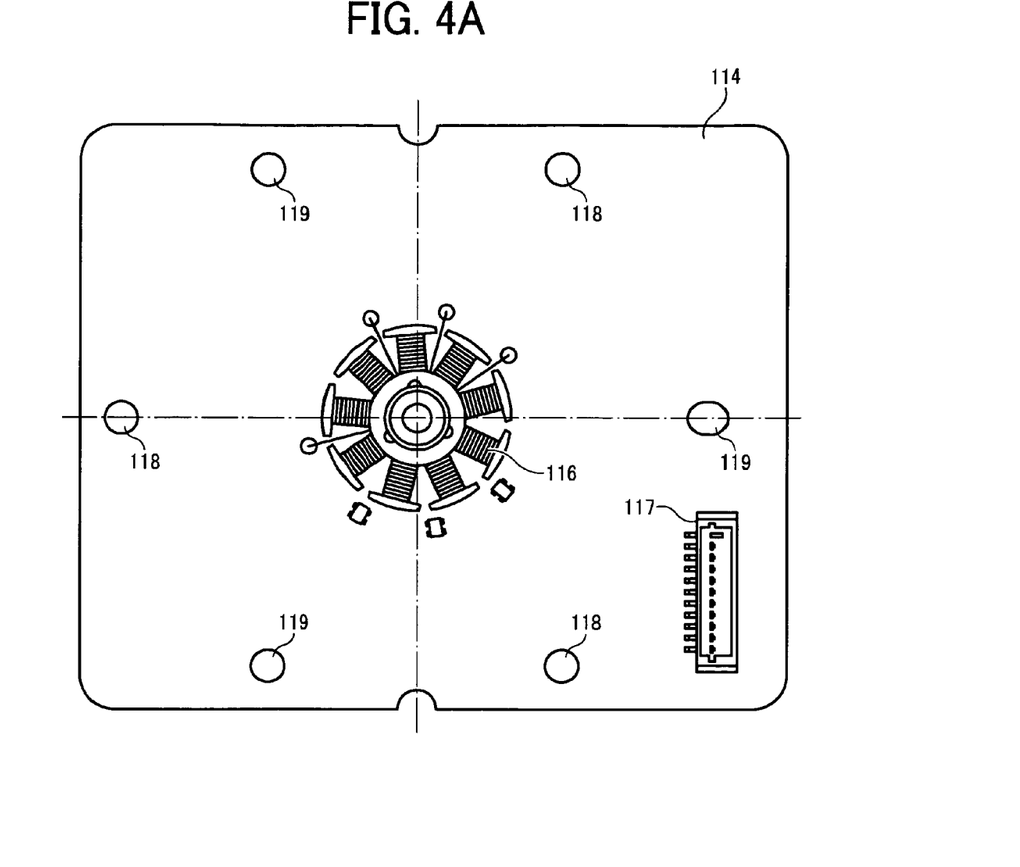
FIG. 4A is a plane view of a scanner board shown in FIG. 2.
Figure 4B:
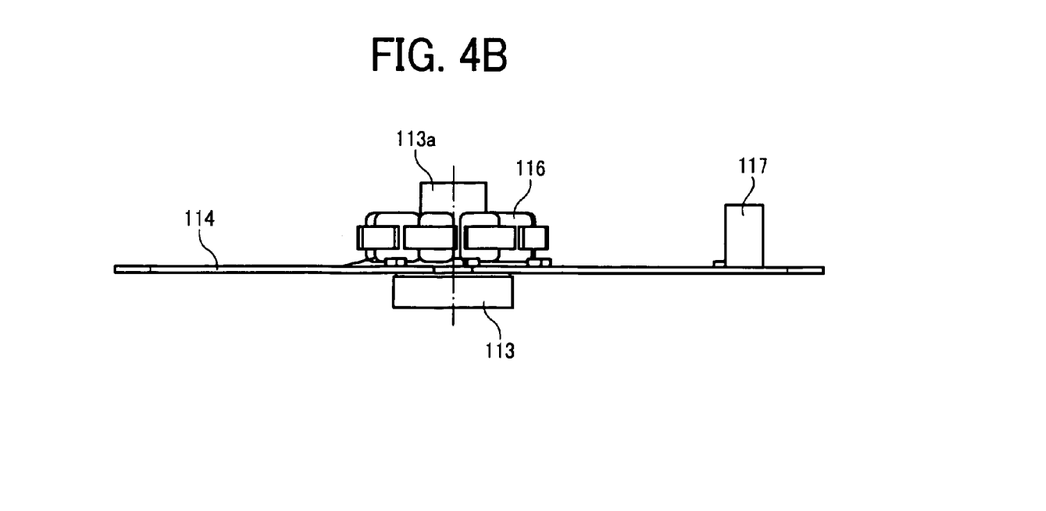
FIG. 4B is a side view of the scanner board.

FIG. 4A is a plane view of the scanner board 114, and FIG. 4B is a side view of the scanner board 114. The scanner board 114 includes three screw holes 118 for fixing the cover 115 to the scanner board 114 and three screw holes 119 for fixing the polygon scanner 110 to the optical housing 101. The bearing 113 is attached to the scanner board 114 such that a cylindrical portion 113a for receiving the rotary shaft 112 is protruded through a hole arranged at the central portion of the scanner board 114. The magnetizing coil 116 is arranged around the cylindrical portion 113a. The connector 117 is arranged at an end of the scanner board 114. The connector 117 is connected to a harness (not shown) extending from a drive circuit 109 shown in FIG. 2.

A control board (the drive circuit 109) that controls a value of a current applied to the scanner board 114 thereby controlling the polygon scanner 110 is arranged separately from the scanner board 114. Alternatively, it is possible that the control board and the scanner board 114 are integrally formed so that the control board is mounted in the polygon scanner 110.

Figure 5:
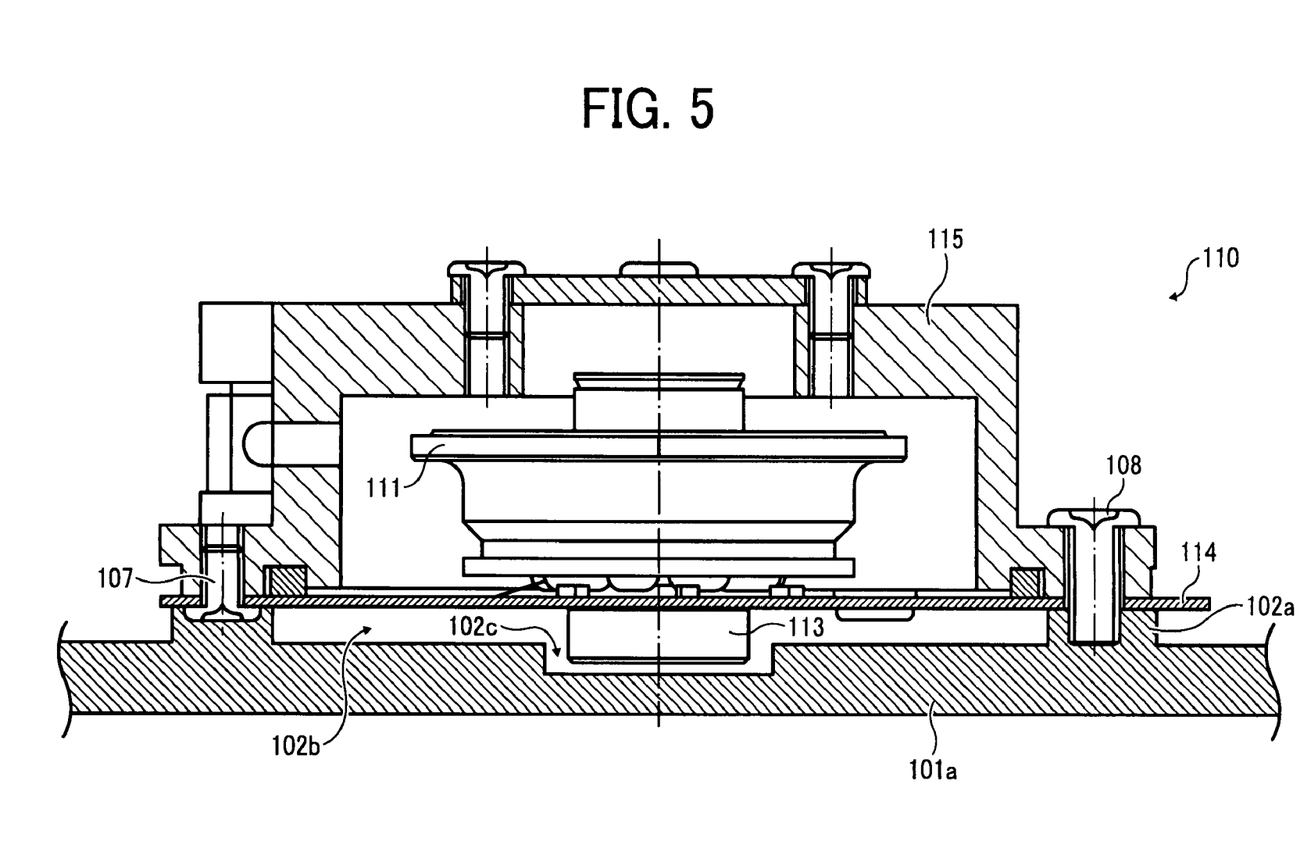
FIG. 5 is a cross-sectional view of the polygon scanner mounted on the optical housing.

FIG. 5 is a cross-sectional view of the polygon scanner 110 mounted on the optical housing 101. The cover 115 is placed over the polygon mirror 111 rotatably supported by the scanner board 114 and the cover 115 is fixed to the scanner board 114 with the screws 107 whereby the polygon scanner 110 is formed. The polygon scanner 110 is then fixed to the scanner-unit attachment portion 102 with the screws 108.

Because the polygon scanner 110 generates heat due to a high-speed rotation of the polygon mirror 111 and temperature of the polygon scanner 110 is increased, it is necessary to efficiently exhaust heat. Therefore, the scanner board 114 is directly mounted on the optical housing 101. Specifically, as shown in FIGS. 2 and 5, the scanner-unit attachment portion 102 is formed on the bottom of the optical housing 101 by a wall portion 102a protruded from the bottom plate 101a. The wall portion 102a is formed like a continuous wall in substantially a quadrangle corresponding to a planar shape (substantially a quadrangle in the first embodiment) of the scanner board 114, and an inner area 102b surrounded by the wall portion 102a is positioned at one level lower than the wall portion 102a (the inner area 102b is positioned at the same level as the bottom plate 101a). The scanner board 114 is mounted on the upper surface of the wall portion 102a. A recessed portion 102c for receiving the bearing 113 is formed at the central portion of the scanner-unit attachment portion 102. Although the recessed portion 102c looks like a circular hole (opening) formed on the bottom plate 101a as shown in FIGS. 1 and 2, it is not a through-hole but a recessed portion positioned at one level lower than the bottom plate 101a as shown in FIG. 5.

As described above, the scanner board 114 is directly mounted on the upper surface of the wall portion 102a protruded from the bottom plate 101a without forming an opening on the bottom plate 101a, so that the bottom of the polygon scanner 110 is covered by the bottom plate 101a and the wall portion 102a in a sealed manner. Thus, it is possible to effectively prevent leakage of vibration noise generated by the polygon scanner 110 to outside and to achieve a quiet operation performed by the optical scanning device 100 and an image forming apparatus.

Furthermore, as described above, the wall portion 102a is positioned at one level higher than the bottom plate 101a, and the scanner board 114 is directly mounted on the upper surface (attachment surface) of the wall portion 102a. Because the attachment surface is positioned at one level higher than the bottom plate 101a, it is possible to perform secondary processing on the attachment surface thereby improving surface accuracy. Thus, it is possible to improve adhesion between the polygon scanner 110 (the scanner board 114) and the attachment surface and prevent leakage of noise from a gap between the polygon scanner 110 and the optical housing 101 thereby reducing sound level. As described above, because the bearing 113 is received by the recessed portion 102c instead of the through-hole, the scanner-unit attachment portion 102 is formed as a closed space as shown in FIG. 5.

Moreover, the polygon scanner 110 (the scanner board 114) makes a tight contact with the attachment surface, and a rotary part of the polygon motor is completely sealed. Thus, it is possible to achieve noise insulation in an improved manner.

Figure 6:
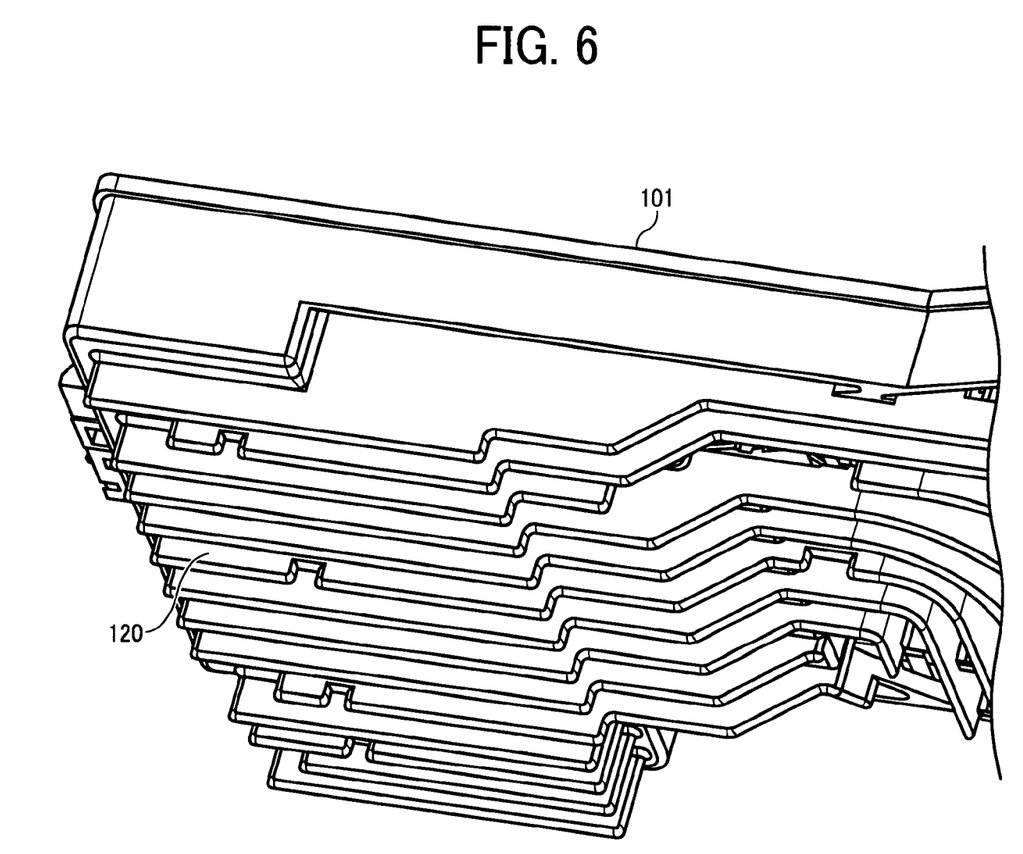
FIG. 6 is a partial perspective view of a plurality of radiation fins arranged on the outer side of the optical housing.

Because the scanner board 114 is attached to the attachment surface with high adhesion, heat exhaust performance (effect of heat conduction from the scanner board 114 to the optical housing 101) is improved. Thus, it is possible to efficiently exhaust heat caused by increase in temperature due to the high-speed rotation of the polygon mirror 111 and effectively prevent heat generated by the polygon scanner 110. FIG. 6 is a partial perspective view of a plurality of radiation fins 120 arranged on the outer side of the optical housing 101. The radiation fins 120 serve as a heat sink that improves heat release performance with an increased surface area.

Figure 7:
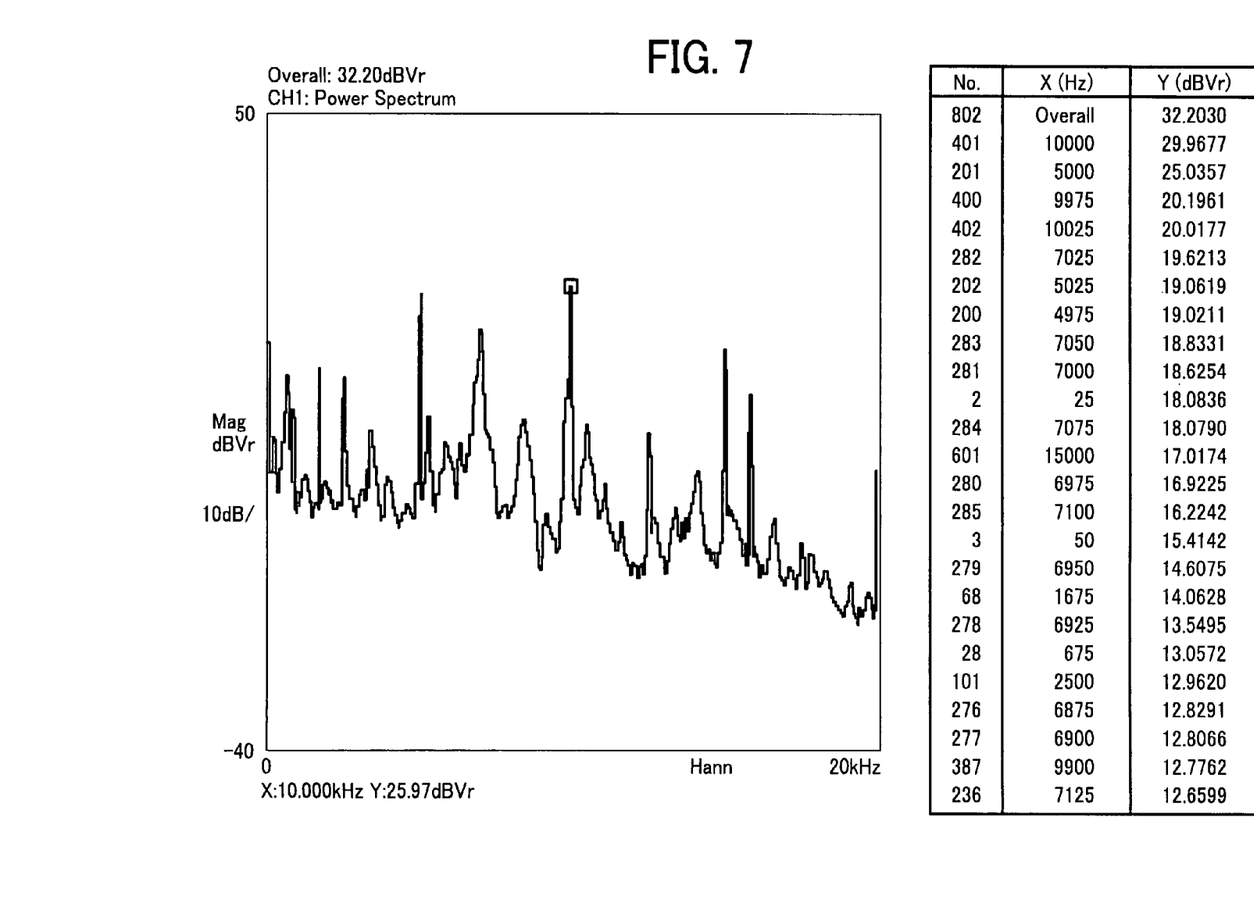
FIG. 7 is a graph with a table showing sound levels measured in the optical scanning device according to the first embodiment.
Figure 8:
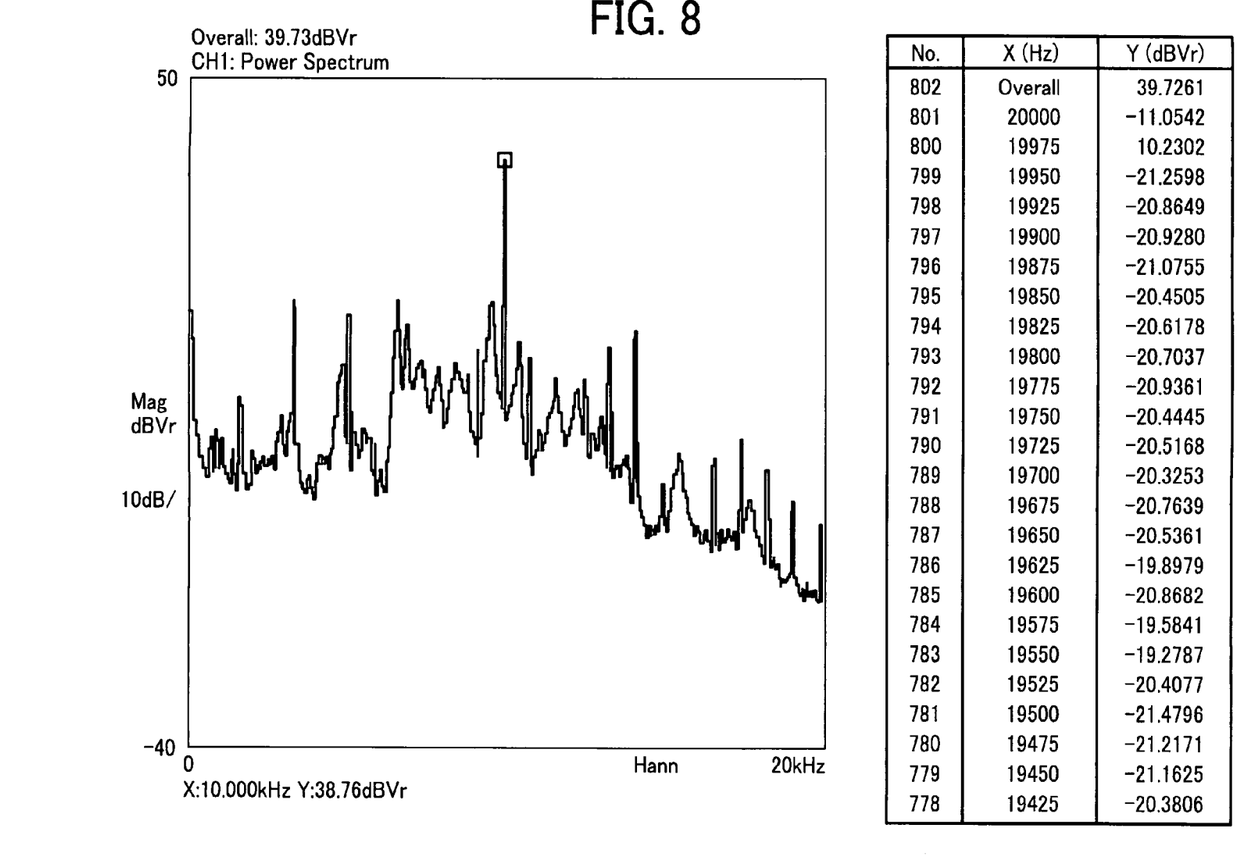
FIG. 8 is a graph with a table showing sound levels measured in an optical scanning device according to a comparative example 1.
Figure 9:
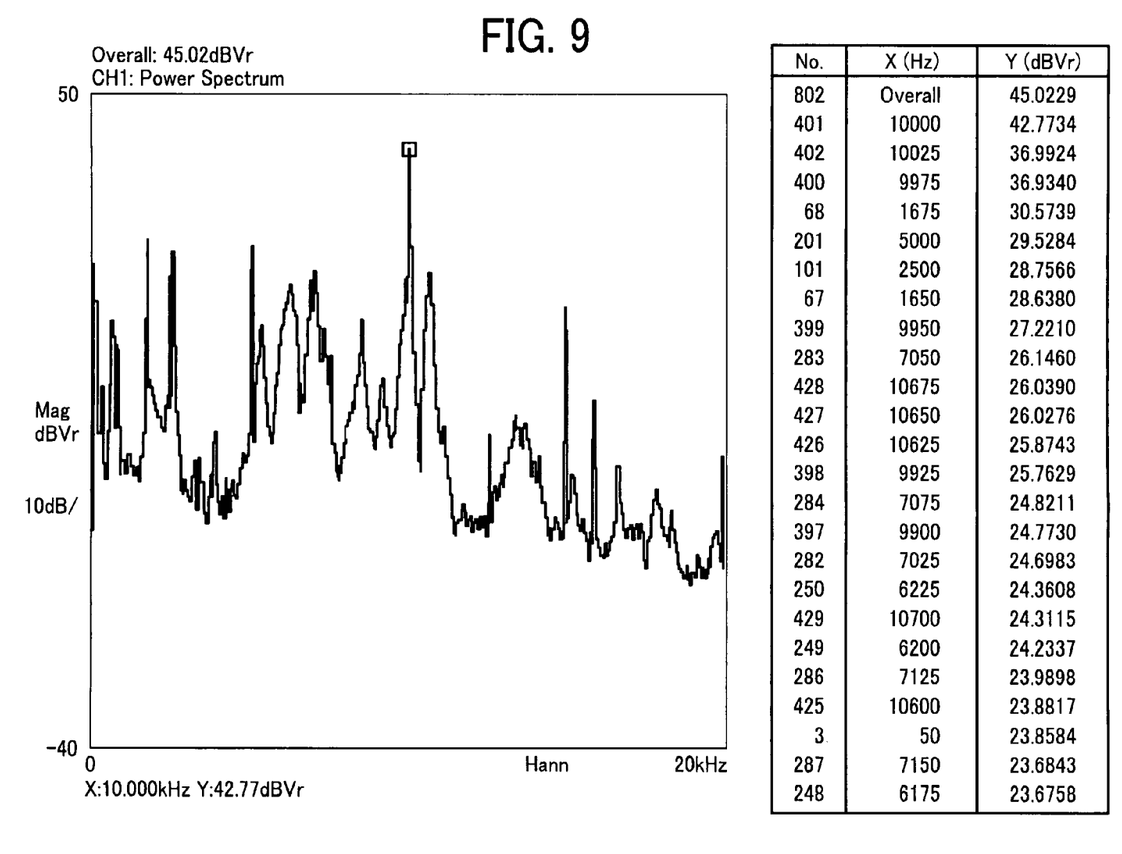
FIG. 9 is a graph with a table showing sound levels measured in an optical scanning device according to a comparative example 2.

FIG. 7 is a graph with a table showing sound levels measured in the optical scanning device 100 at predetermined frequencies. The lateral axis of the graph indicates a frequency in kilohertz (kHz) and the longitudinal axis of the graph indicates a sound level in decibel (db). FIG. 8 is a graph with a table showing sound levels measured in an optical scanning device in which a gap is provided between a polygon scanner and an optical housing according to a comparative example 1, and FIG. 9 is a graph with a table showing sound levels measured in an optical scanning device in which a gap is provided between a polygon scanner and an optical housing according to a comparative example 2. As shown in FIG. 7, both the overall sound level (Overall) and the peak level are lower in the first embodiment than in the comparative examples 1 and 2. Thus, it is possible to achieve a quiet operation performed by the optical scanning device.

Figure 10:
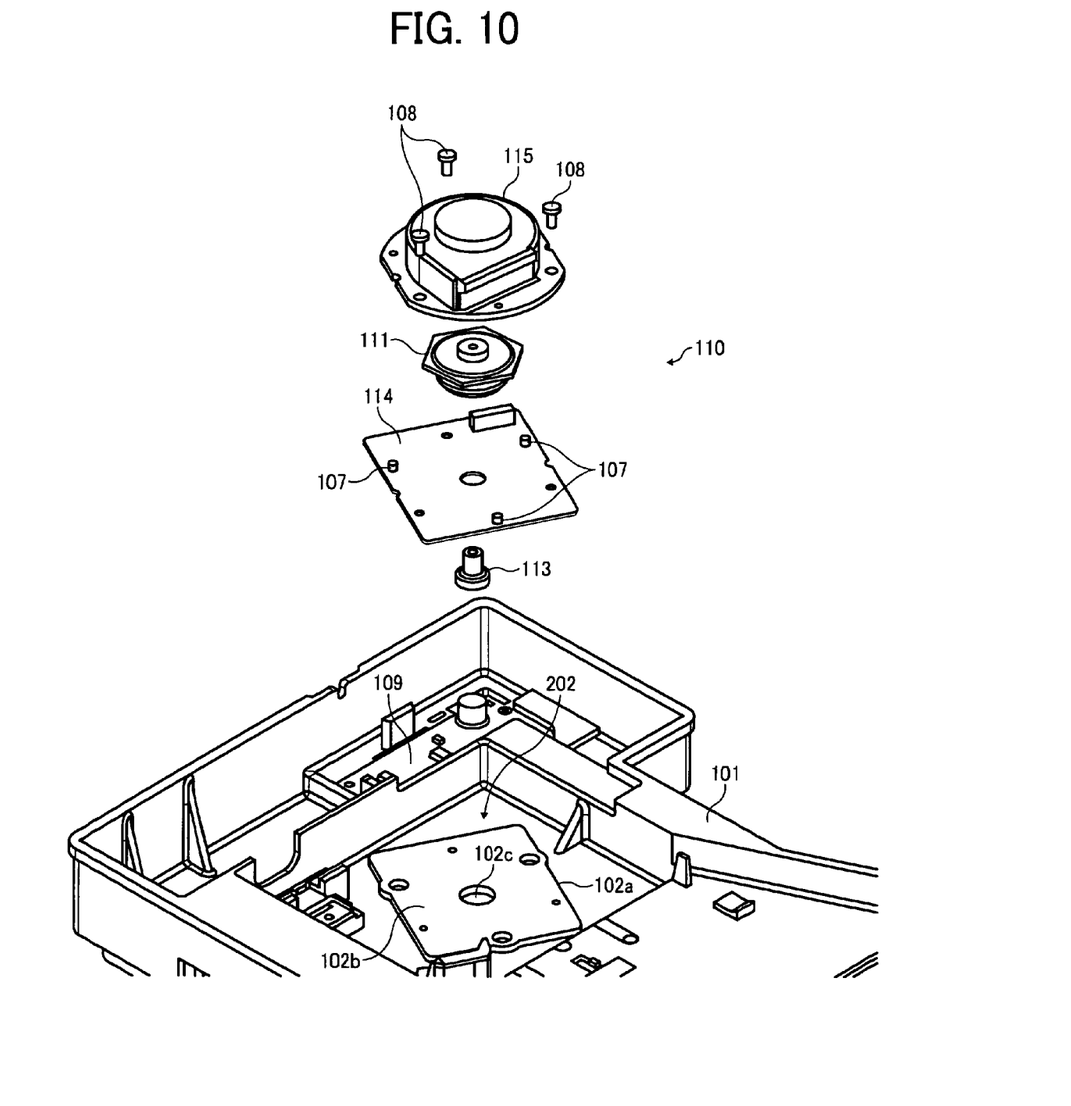
FIG. 10 is a schematic diagram of an optical scanning device according to a second embodiment of the present invention.

FIG. 10 is a schematic diagram of an optical scanning device according to a second embodiment of the present invention. The inner area 102b is not arranged in the second embodiment. Instead, the whole of a scanner-unit attachment portion 202 is arranged as an attachment surface 102d positioned at one level higher than the bottom plate 101a. The recessed portion 102c for receiving the bearing 113 is formed on the attachment surface 102d. Because the configuration of the optical scanning device in the second embodiment is the same as that in the first embodiment except for the point described above, its explanation is omitted.

As described above, because the whole of the scanner-unit attachment portion 202 is arranged as the attachment surface 102d, the planar shape of the scanner board 114 is substantially the same as the shape of the upper surface of the attachment surface 102d. Thus, an area of the attachment surface 102d is largely increased whereby the heat exhaust performance is significantly improved. Therefore, it is possible to effectively prevent the heat generated by the polygon scanner 110.

A scanning light emitted from the light-source unit 106 is passed through a cylindrical lens (not shown), reflected by a mirror (not shown), and then guided to the polygon scanner 110 attached to the scanner-unit attachment portion 102. The scanning light reflected by the polygon mirror 111 is passed through the fθ lens 103 and the long lens 104, reflected by the reflecting mirror 105, and projected downward in FIG. 1 from the optical housing 101, so that a target surface of a photosensitive element (not shown) included in the image forming apparatus is irradiated with the scanning light.

Figure 11:
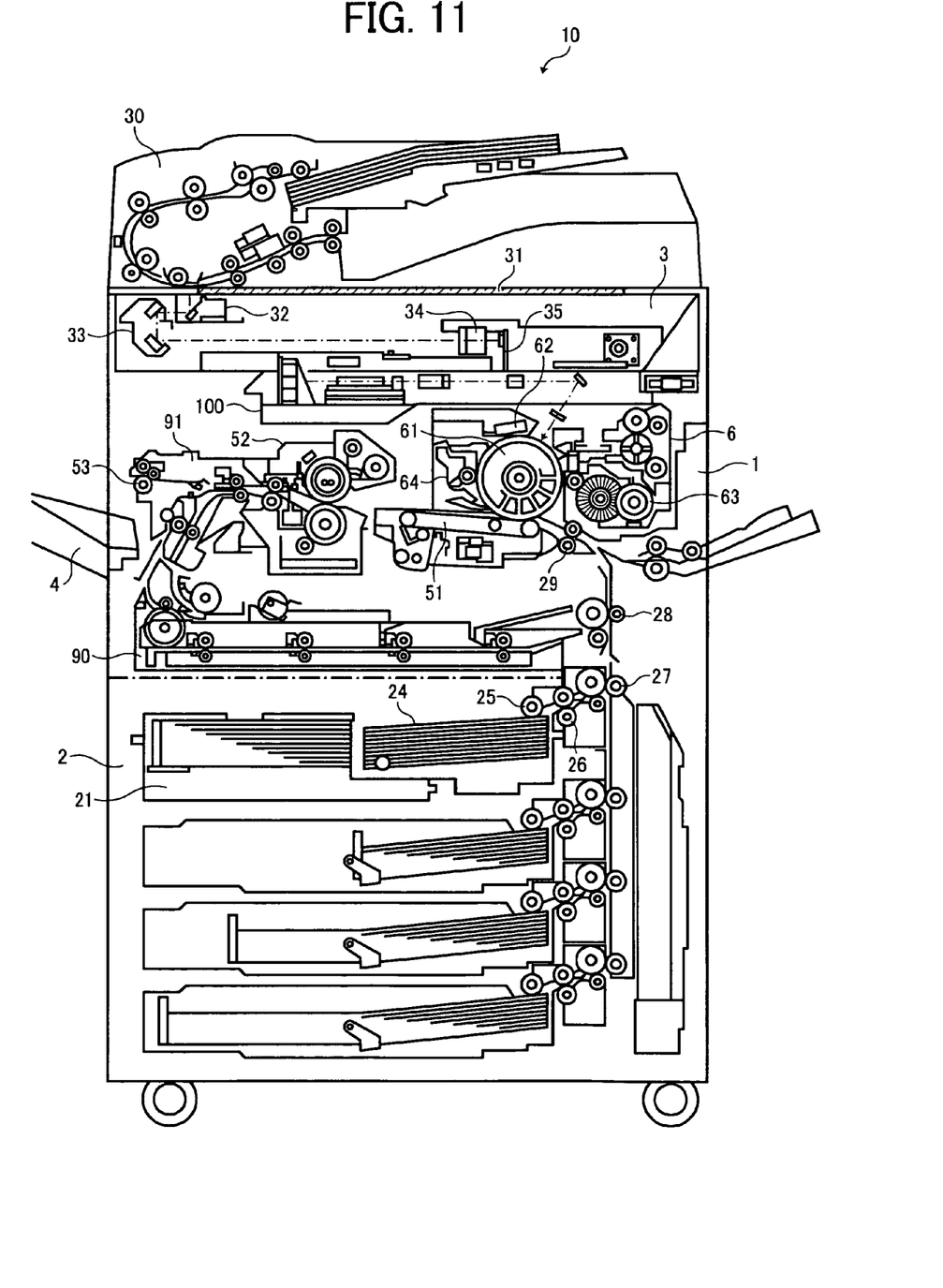
FIG. 11 is a schematic diagram of an image forming apparatus including the optical scanning device according to the first embodiment.

FIG. 11 is a schematic diagram of an image forming apparatus 10 including the optical scanning device 100. The image forming apparatus 10 is configured as a copying machine and has the configuration as described below. An image forming section 1 is arranged roughly in the middle of a main body of the image forming apparatus 10, and a feeding section 2 is arranged under the image forming section 1. The feeding section 2 includes a feed tray 21 that is arranged for each stage. A reading section 3 that reads image of an original is arranged above the image forming section 1. A discharge section 4 is arranged on the left side of the image forming section 1 in FIG. 11 whereby a recording medium with image formed thereon is discharged to the discharge section 4.

An image forming unit 6 is arranged in the image forming section 1, and a charger 62, a developing device 63, a cleaning device 64, and the like, are arranged around a photosensitive element 61 serving as an image carrier. The charger 62 charges a surface of the photosensitive element 61. The developing device 63 develops an electrostatic latent image formed on the surface of the photosensitive element 61. The cleaning device 64 removes residual toner from the surface of the photosensitive element 61. The optical scanning device 100 is arranged above the image forming unit 6. A transfer device 51 that transfers a toner image formed on the surface of the photosensitive element 61 onto a recording medium is arranged under the photosensitive element 61. A fixing device 52 is arranged on the side of the transfer device 51. The fixing device 52 fixes the toner image to the recording medium by applying heat and pressure to the recording medium when the recording medium is passed through a pair of rollers included in the fixing device 52. After the recording medium is passed through the fixing device 52, the recording medium is discharged to the discharge section 4 by a discharge roller 53.

The feed tray 21 contains a pile of unused recording media, and a rotatably supported bottom plate 24 lifts up the pile to a position where a recording medium placed at the top of the pile can be in contact with a pick-up roller 25. The recording medium placed at the top of the pile is fed from the feed tray 21 in accordance with the rotation of a feed roller 26, and then conveyed to a pair of registration rollers 29 by a pair of conveying rollers 27, 28.

The registration rollers 29 temporarily stops the recording medium, and starts to rotate again at appropriate timing such that the toner image formed on the surface of the photosensitive element 61 and the edge of the recording medium are located at a predetermined position relation.

In the reading section 3, moving units 32, 33 including a light source for illuminating the original and a mirror are reciprocated to read an image of an original placed on an exposure glass 31. Image data obtained by the moving units 32, 33 is loaded into a charge-coupled device (CCD) 35 arranged on the back side of a lens 34 as an image signal. The image signal is then digitized and subjected to image processing by an image processing unit (not shown). In the image forming section 1, the laser diode included in the optical scanning device 100 emits a light beam based on the image signal processed by the image processing unit whereby an electrostatic latent image is formed on the surface of the photosensitive element 61 with the light beam. An automatic document feeder (ADF) 30 that automatically feeds an original is arranged above the reading section 3.

When duplex printing is to be performed, the recording medium with the toner image fixed thereto is conveyed through a path branched at a branch area 91, is turned over at a reverse area 90, and is conveyed to the registration rollers 29. The skew of the recording medium is corrected by the registration rollers 29, and then an image forming process is performed on the back side of the recording medium.

The image forming apparatus 10 can be a multifunction product (MFP) having a function of a facsimile that transmits and receives image data of an original to and from a remote device by using a control unit (not shown) and a function of a printer that prints out image data processed by a computer (not shown) on a recording medium in addition to a function of a so-called digital copying machine that digitizes image data of an original and reproduces the image data on a recording medium.

The present invention is not limited to the above embodiments. For example, the shape and the configuration of the cover 115 can be determined as appropriate. The material and the configuration of the scanner board 114 can be arbitrarily determined, and an element to be mounted on the scanner board 114 also can be arbitrarily determined. The control board (the drive circuit 109) and the scanner board 114 can be integrally formed so that the control board can be mounted in the polygon scanner 110. The shape, and the like, of the scanner-unit attachment portion 102 can be arbitrarily determined, and a height of the wall portion 102a protruded from the bottom plate 101a can be set as appropriate.

Arrangement of optical elements such as a lens and a mirror included in the optical scanning device 100 can be arbitrarily set. Although the scanning light is projected downward in FIG. 1 from the optical housing 101, the scanning light can be projected upward in FIG. 1. Furthermore, the present invention can be applied to an optical scanning device employing a multibeam system or an optical scanning device used for a full-color image forming apparatus in which two pairs of optical elements are arranged on both sides of a polygon mirror.

The configuration of each of the units such as the image forming unit included in the image forming apparatus can be arbitrarily determined. The present invention can be applied to a multi-color or a full-color image forming apparatus as well as a monochrome image forming apparatus. The image forming apparatus can be a printer, a facsimile, or a multi-function product (MFP) as well as a copying machine.

According to one aspect of the present invention, it is possible to effectively prevent leakage of vibration noise generated by a polygon motor to outside and achieve a quiet operation performed by an optical scanning device.

Furthermore, according to another aspect of the present invention, a heat generation can be prevented in a polygon scanner.

Moreover, according to still another aspect of the present invention, a leakage of noise from a gap between the polygon scanner and an optical housing can be reduced, and a heat exhaust performance can be improved.

Furthermore, according to still another aspect of the present invention, it is possible to reduce costs for a secondary processing performed on a convex portion of a scanner-unit attachment portion.

Moreover, according to still another aspect of the present invention, the scanner board can makes a tight contact with an upper surface of the convex portion in direct contact with each other.

Furthermore, according to still another aspect of the present invention, it is possible to exhaust a heat generated by a motor.

Moreover, according to still another aspect of the present invention, it is possible to improve strength, magnetic shielding, and heat release efficiency of the scanner board.

Furthermore, according to still another aspect of the present invention, the number of components and costs can be reduced, and a space required for the optical scanning device can be reduced.

Moreover, according to still another aspect of the present invention, it is possible to achieve a quiet operation performed by the polygon scanner and improve the heat exhaust performance.

Furthermore, according to still another aspect of the present invention, it is possible to obtain an image with a high quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
   a polygon scanner that includes:
      a polygon mirror that reflects a light beam emitted from a light source,
      a bearing that rotatably supports the polygon mirror,
      a polygon motor that rotates the polygon mirror, and
      a scanner board on which a component of the polygon motor is mounted;
   an optical housing in which the polygon scanner is mounted; and
   a scanner-unit attachment portion to which the polygon scanner is attached, the scanner-unit attachment portion including a convex portion protruded from a bottom plate of the optical housing, the convex portion being formed in a shape of a wall which is continuous without forming any chasm along a circumferential portion of the scanner board, and the convex portion surrounding the polygon mirror from a planar direction of the scanner board, wherein
   the scanner board makes a tight contact with an upper surface of the convex portion in direct contact with each other, and a bottom portion of the polygon scanner is covered and sealed by the convex portion and the bottom plate of the optical housing in a closed space formed by the scanner-unit attachment portion.

2. The optical scanning device according to claim 1, wherein a whole of the scanner-unit attachment portion is formed as the convex portion protruded from the bottom plate of the optical housing such that the upper surface of the convex portion has substantially a same shape as the planer shape of the scanner board.

3. The optical scanning device according to claim 1, wherein
   a part of the bearing is protruded from a surface of the scanner board on an opposite side of the polygon mirror,
   the optical scanning device further includes a receiving portion that receives a protruded part of the bearing, and the receiving portion is formed as a recessed portion on any of the bottom plate of the optical housing and an upper surface of the scanner-unit attachment portion without forming an opening on the bottom plate of the optical housing or on the upper surface of the scanner-unit attachment portion, and
   the scanner-unit attachment portion completely seals a rotary part of the polygon motor in the closed space.

4. The optical scanning device according to claim 2, wherein
   a part of the bearing is protruded from a surface of the scanner board on an opposite side of the polygon mirror,
   the optical scanning device further includes a receiving portion that receives a protruded part of the bearing, and the receiving portion is formed as a recessed portion on any of the bottom plate of the optical housing and an upper surface of the scanner-unit attachment portion without forming an opening on the bottom plate of the optical housing or on the upper surface of the scanner-unit attachment portion, and
   the scanner-unit attachment portion completely seals a rotary part of the polygon motor in the closed space.

5. The optical scanning device according to claim 1, wherein at least a magnetizing coil, a magnet, a hall element, wiring, and a connector are mounted on the scanner board.

6. The optical scanning device according to claim 1, wherein the scanner board is any of an iron board and a glass epoxy board having an iron plate attached to its lower surface.

7. The optical scanning device according to claim 1, wherein the scanner board includes a drive circuit that controls the polygon scanner.

8. The optical scanning device according to claim 1, wherein a cover that covers the polygon mirror is fixedly mounted on the scanner board.

9. An image forming apparatus comprising an optical scanning device that scans a scanning surface with a light beam, the optical scanning device comprising:
   a polygon scanner that includes:
      a polygon mirror that reflects a light beam emitted from a light source,
      a bearing that rotatably supports the polygon mirror,
      a polygon motor that rotates the polygon mirror, and
      a scanner board on which a component of the polygon motor is mounted;
   an optical housing in which the polygon scanner is mounted; and
   a scanner-unit attachment portion to which the polygon scanner is attached, the scanner-unit attachment portion including a convex portion protruded from a bottom plate of the optical housing, the convex portion being formed in a shape of a wall which is continuous without forming any chasm along a circumferential portion of the scanner board, and the convex portion surrounding the polygon mirror from a planar direction of the scanner board, wherein
   the scanner board makes a tight contact with an upper surface of the convex portion in direct contact with each other, and a bottom portion of the polygon scanner is covered and sealed by the convex portion and the bottom plate of the optical housing in a closed space formed by the scanner-unit attachment portion.

10. The image forming apparatus according to claim 9, wherein a whole of the scanner-unit attachment portion is formed as the convex portion protruded from the bottom plate of the optical housing such that the upper surface of the convex portion has substantially a same shape as the planer shape of the scanner board.

11. The image forming apparatus according to claim 9, wherein
   a part of the bearing is protruded from a surface of the scanner board on an opposite side of the polygon mirror,
   the optical scanning device further includes a receiving portion that receives a protruded part of the bearing, and the receiving portion is formed as a recessed portion on any of the bottom plate of the optical housing and an upper surface of the scanner-unit attachment portion without forming an opening on the bottom plate of the optical housing or on the upper surface of the scanner-unit attachment portion, and
   the scanner-unit attachment portion completely seals a rotary part of the polygon motor in the closed space.

12. The image forming apparatus according to claim 10, wherein
   a part of the bearing is protruded from a surface of the scanner board on an opposite side of the polygon mirror,
   the optical scanning device further includes a receiving portion that receives a protruded part of the bearing, and the receiving portion is formed as a recessed portion on any of the bottom plate of the optical housing and an upper surface of the scanner-unit attachment portion without forming an opening on the bottom plate of the optical housing or on the upper surface of the scanner-unit attachment portion, and the scanner-unit attachment portion completely seals a rotary part of the polygon motor in the closed space.

13. The image forming apparatus according to claim 9, wherein at least a magnetizing coil, a magnet, a hall element, wiring, and a connector are mounted on the scanner board.

14. The image forming apparatus according to claim 9, wherein the scanner board is any of an iron board and a glass epoxy board having an iron plate attached to its lower surface.

15. The image forming apparatus according to claim 9, wherein the scanner board includes a drive circuit that controls the polygon scanner.

16. The image forming apparatus according to claim 9, wherein a cover that covers the polygon mirror is fixedly mounted on the scanner board.

* * * * *